March 10, 1964     X. HEITZER     3,124,637
APPARATUS FOR EXAMINING PRESTRESSED GLASS
Filed June 17, 1958     2 Sheets-Sheet 1

Xaver Heitzer
Inventor:

Mason, Porter, Miller & Stewart
Attorneys

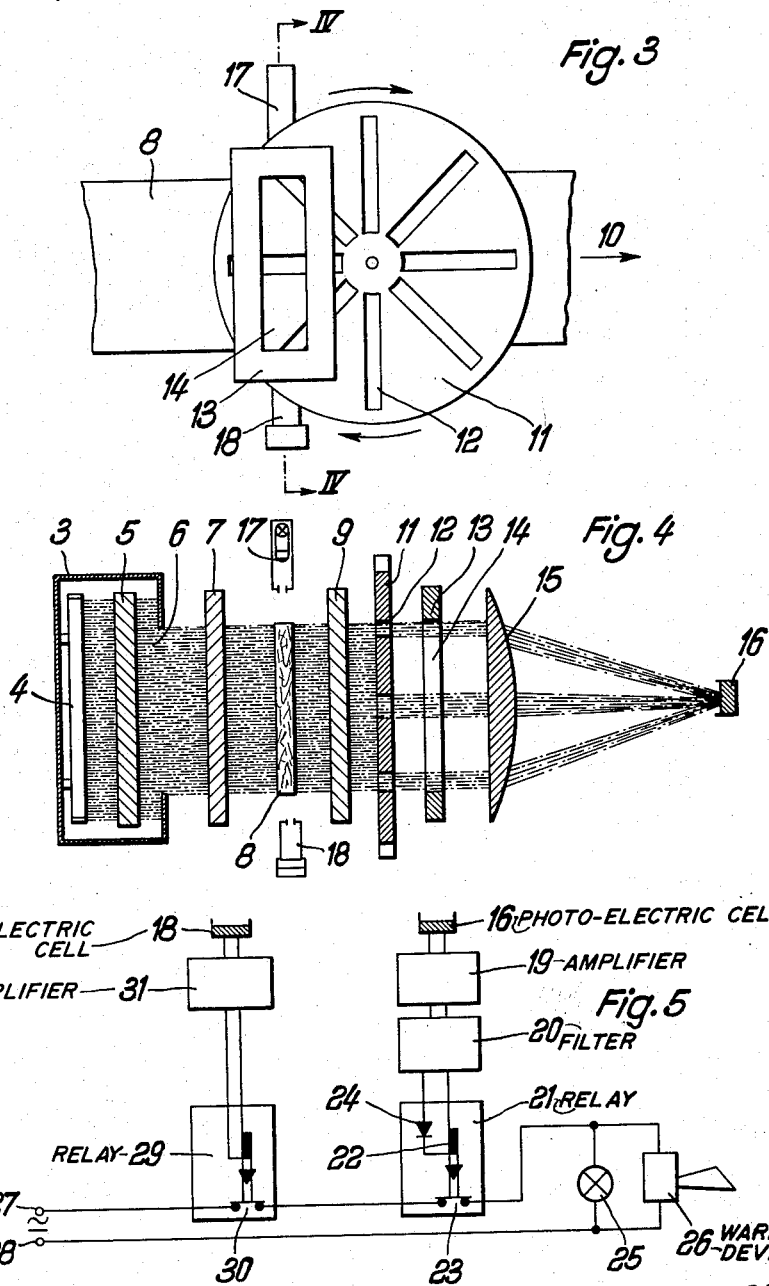

United States Patent Office 3,124,637
Patented Mar. 10, 1964

3,124,637
APPARATUS FOR EXAMINING
PRESTRESSED GLASS
Xaver Heitzer, Porz (Rhine), Germany, assignor to Spiegelglaswerke Germania A.G., Porz-Urbach, Germany
Filed June 17, 1958, Ser. No. 742,512
Claims priority, application Germany July 3, 1957
2 Claims. (Cl. 88—14)

The invention relates to an apparatus for examining prestressed glass, more especially safety glass.

It is known that internal stresses can be imparted to the glass by special cooling conditions, so that in the event of the glass breaking, these stresses produce the effect that no knife-like sharp-edged fragments are formed, but only comparatively small compact fragments without sharp edges. It is also known that glasses which in the unstressed condition do not show any optical activity with respect to polarised light, become doubly refracting and thus optically active in the prestressed condition. This property is already used so that the internal stress condition of glass elements, more especially sheets of glass, are made visible optically, this being effected by irradiating the specimen with polarised light and conducting the transmitted light through an analyser in crossed relation to the polarisation plane of the light. Whereas unstressed glass or stress-free zones in a prestressed glass appear dark when thus observed in polarised light, the plane of vibration of the transmitted polarised light at the places at which the glass is under internal compressive or tensile stresses is rotated to a greater or lesser extent, so that these places appear lighter when observed through the analyser disposed cross-wise.

With a varying distribution of compressive and tensile stresses in a glass element, for example in a sheet of safety glass, a more or less regular pattern of dark bands on a light background is seen when viewing the specimen as described above. From the arrangement and the spacing of the bands of this pattern formation, the manufacturer of prestressed glass, more especially safety glass, can arrive at conclusions concerning the state of stressing of the test element and reject those which have a stress distribution which differs from the standard. In particular, by using this method, it can immediately be recognised whether the specimen contains therein relatively large zones which, if the specimen is subsequently broken, would not break up as small pieces but in the form of elongated sharp splinters. Such zones do not show any pattern formation when observed as described in polarised light, but appear generally in a uniform light colour.

For the previously described examination of prestressed glass, linearly polarised light or more frequently elliptically polarised light is used, since the large-area polarisation filters available today do not produce strictly linearly polarised light, but an elliptically polarised light. The process itself is however not affected by this in practice; with elliptically polarised light, it is only that no complete darkness is produced in the stress-free zones. In the following description, therefore, only polarised light will be referred to for the sake of simplicity.

Whereas the carrying out of the previously described examination process does not present any difficulties when examining specimens in small numbers, an important disadvantage is met when the examination is carried out over relatively long periods of time, for example when a complete production series is continuously checked: the person employed for examination purposes very quickly becomes tired by the monotonous repetition of the same image, so that his attentiveness is definitely impaired and eventually defective specimens pass unnoticed through the control center, especially as incorrectly prestressed elements occur fairly infrequently with the modern methods of manufacture.

However, it is just in connection with the manufacture of safety glass which is for example to be used for the glazing of all types of vehicles that absolutely reliable control methods must be provided. Consequently, when using the known method, it is necessary to use only absolutely reliable persons for observation purposes and to change the operators before any signs of fatigue become apparent. For the same reason, the number of specimens to be checked every working shift must be kept comparatively small.

The process according to the invention consists in that the image being formed behind the analyser and corresponding to the internal stresses of the specimen being examined is split up into image elements succeeding one another as a function of time by periodically repeated screen-like masking of one or more light beams having a total cross-section which is constant in time, and the brightness curve of the masked light as a function of time is measured, indicated or recorded and used as a criterion for the local stress distribution in the element being examined.

By a screen-like masking, there is understood here any type of masking in which the image is split up into juxtaposed elements which are successively scanned in any sequence as a function of time. The pattern and the sequence of the scannnig of the image elements is per se unimportant. For example, the image can be split up into lines in the manner known from television and each line can be analysed into separate image elements or image points; it can however also be subdivided by a spiral or by concentric circles as well as straight lines intersecting the latter. In each case, the masked light beam will show fluctuations in brightness as a function of time when scanning an image with a light and dark pattern, which fluctuations are repeated periodically with the periodically repeated scannnig.

Depending on the nature of the stress distribution in the elements being examined and thus of the formation of the image pattern, the light beam during an image scanning operation successively sweeps over light and dark parts in a more or less large number, this number naturally depending to a certain extent also on the selected method and sequence of the scanning. The brightness of the masked light beam is therefore a periodic function of the time which has a predetermined frequency spectrum according to the stress distribution in the element and the nature of the scanning. This frequency spectrum will naturally be displaced towards higher frequencies with an increase in the scanning speed. Similarly, the separate frequencies of the spectrum are increased if, instead of one light beam, several light beams are used simultaneously for the scanning or are masked from the image. In order that fluctuations in brightness are not already produced with a completely contrast-free image, i.e. with a test element with completely homogeneous stress distribution, the total cross-section of the light beam or beams is to be constant in time.

The brightness curve of the masked light as a function of time is measured according to the invention and indicated and/or recorded in any suitable manner.

During the examination of the specimen in accordance with the invention, the said specimen is either fixedly arranged or moved past the examination light. It is advantageous to make provision for the specimen to be displaced in a direction transversely of the direction of the light for the screen-like scanning during the examination itself, while the masked light beam is moved in another direction transversely of the direction of movement of the specimen. In this way, on the one hand the screen-like analysis of the image is facilitated and on the other hand it is possible to examine larger specimens. The masked light beam can be moved in line fashion along straight guiding lines or also circularly or along any desired other curves, provided only that it is moved transversely of the direction of movement of the specimen, i.e. intersects its direction of movement, and thereby sweeps over the entire cross-sectional surface of the specimen.

The masking of the light beam can be effected according to the invention between the light source and the specimen; it is unimportant whether the masking is effected before or behind the polariser. In each case, only the masked light beam falls on the specimen and the plane of vibration of this beam in passing through the specimen is rotated to a greater or lesser extent according to the local stressing condition, whereupon the beam passes through the analyser and correspondingly has a greater or lesser brightness behind the said analyser. With this method of masking, the image is to some degree latent and only gradually becomes visible behind the analyser in the form of the individual image elements. For the process according to the invention, it is however unimportant whether the formation of the optical image of the internal stresses in the specimen becomes visible simultaneously or as a time sequence.

The masking of the light beam can also be effected according to the invention between the specimen and the analyser. In this case, the specimen is actually traversed by polarised light simultaneously throughout its entire cross-section, but the image visible behind the analyser is latent and becomes gradually visible.

Finally, the masking of the light beam can also be effected according to the invention from the light field transmitted by the analyser. In this case, the image corresponding to the internal stresses in the specimen appears behind the analyser and the individual image elements of this image are successively masked out.

The brightness curve of the masked light as a function of time can be measured by any optical measuring method and be indicated or recorded. It is however preferably suggested that the brightness curve of the masked light as a function of time should be photoelectrically converted into an electric voltage or current as a function of time. This method has the advantage that the examination of the frequency curve mentioned above can be carried out in a very much more convenient manner, since many methods and devices are available for measuring electrical vibrations. The electrical vibrations produced in the scanning of a specimen with a non-homogeneous stress distribution can be investigated, indicated and/or recorded in a manner known per se on the basis of its frequency spectrum, and particularly the simple possibility of amplifying electric vibrations is available for the investigation.

The electric voltage or current can be indicated in various ways. As a preferred proposal, for making apparent a voltage in the specimen which produces periodic brightness fluctuations of the masked light, the corresponding fluctuations in voltage or current are converted into sound vibrations.

Since the frequency generated with a certain image pattern can readily be displaced to the range of audibility by the choice of the scanning speed and to a certain degree also by increasing the number of the light beams which are simultaneously masked, this form of the process according to the invention makes it possible for the internal stress distribution to be controlled audibly. In this way, a certain audible sound corresponds to a certain stress distribution in the specimen, while deviations from the normal sound enable it to be concluded that there is a deviation from the normal stress distribution.

This process can also be developed in the sense that the audible reproduction of the vibrations within a certain frequency range are suppressed by filtering, while vibrations below or above the prescribed frequency range are reproduced audibly. The sudden occurrence of deeper or higher tones then shows deviations from the normal stress distribution in the specimen.

An apparatus for carrying out the process in accordance with the invention, in which a polariser and an analyser intersecting the latter are interposed in the path of rays of a light source and the specimen is arranged between the polariser and the analyser, comprises according to the invention a movable diaphragm which is interposed in the path of rays and which has one or more transmission windows for the light, which windows sweep over the image plane in the manner of a screen and with periodic repetition as the diaphragm is moved and also an arrangement for measuring, indicating or recording the brightness of the masked light.

In accordance with the three forms of the process as described above, the diaphragm can either be arranged between the light source and the specimen, or between the specimen and the analyser, or in front of the analyser.

The diaphragm can be of any desired construction, provided only that it has one or more transmission windows and conducts these with periodic repetition over the light cross-section corresponding to the specimen and the image.

It is however advantageous to provide for the diaphragm to be a circular disc rotating at a constant speed and having one or more openings which extend radially or spirally outwards and which are distributed uniformly over its area. The openings can extend outwardly in the form of slits or also be distributed in the form of circular or other shaped holes over the surface of the circular disc.

It is also proposed that the measuring arrangement should comprise an active or passive photoelectric converter and a focussing optical system concentrating the masked light on to this converter. Suitable for the aforementioned purpose are all photoelectric converters, i.e. photoelectric cells with an internal or external photoelectric effect, light-sensitive semi-conductors, photo-transistors or the like, whether they actively produce a voltage corresponding to the amount of incident light or vary their internal resistance. The focussing lens system can comprise axially symmetrical lenses or cylindrical lenses, according to the form and size of the specimen and the arrangement of the light source and diaphragm.

For carrying out the process described above, in which the fluctuations in brightness are directly made audible, an arrangement is proposed which comprises an electro-acoustic converter, for example a known loudspeaker, which is connected to the photoelectric converter (if necessary by way of an amplifier) and by which the fluctuations in voltage or current produced with fluctuations in brightness of the light beam are converted into sound vibrations.

The arrangement according to the invention preferably comprises an amplifier connected to the photoelectric converter, an electric filter which is connected before, in or behind this amplifier and which only transmits frequencies within a predetermined range and an indicating means connected to the output of the amplifier-filter circuit. Any known wave filter, a band filter, high-pass filter or low-pass filter can be used as the said filter. The filter can more especially also be incorporated into the amplifier for example by the latter being constructed as a resonance amplifier which only amplifies frequencies within a predetermined frequency range. Such circuits are known from the electrical communication art and the construction thereof does not come within the scope of the invention.

A pointer-type instrument, an incandescent lamp, a cathode ray tube or any other arrangement known per se can be used as the indicating means. The indicating means does however preferably comprise a relay responding to the frequencies transmitted by the filter and an optical and/or acoustic warning device controlled by the said relay. Such an indicating means does not reproduce the transmitted frequency path in detail, but merely indicates whether frequencies within the prescribed frequency range occur or not. As relay, there is either employed an electromechanical relay, perhaps with a rectifier connected to the input side thereof, or a relay tube or one of the known relay circuits. As soon as the filter or the amplifier passes an alternating voltage of a predetermined minimum amplitude, the relay responds and switches the warning device on or off. In this way, it is possible in a simple manner to recognise whether the stress distribution in the specimen corresponds to the standard specification or deviates therefrom.

The relay can in certain cases also control the examination process, preferably in such a way that it stops the advance of the specimen in the event of deviations from the required stress distribution.

The relay is preferably so connected that the warning device is switched off when frequencies occur which are within the prescribed frequency range, but is switched on in the absence of such frequencies.

In order that the warning device does not also respond when the specimen is removed from the testing apparatus or when changing it for another specimen, a blocking arrangement is provided which switches off the warning device in the absence of a specimen and permits it to be switched on again by the said relay only when a specimen is available in the testing apparatus.

The blocking device can be made in various ways and contain mechanical, pneumatic or electric detectors or feelers which respond when a specimen is introduced and cause the said blocking of the warning device. It is however preferred that the blocking device should comprise a photoelectric light barrier arranged on both sides of the specimen along a line of low light transmission and a relay connected to said barrier, if necessary through an amplifier, the normal contact of said relay being in the circuit of the warning device and opening this circuit when the light barrier responds due to removal of the specimen but closing it when a specimen is introduced into the said light barrier. If for example the specimen is a pane of glass, the light barrier, i.e. the light source and photoelectric cell forming the latter, is arranged at two oppositely disposed narrow edges of the sheet of glass.

The invention is more fully explained hereinafter by reference to one constructional example given in the drawing, wherein:

FIG. 3 is a section on the line III—III of FIG. 2;

FIG. 4 is a section along the line IV—IV of FIG. 3; and

FIG. 5 is a circuit diagram for the apparatus according to FIGS. 2 to 4.

Figure 1:
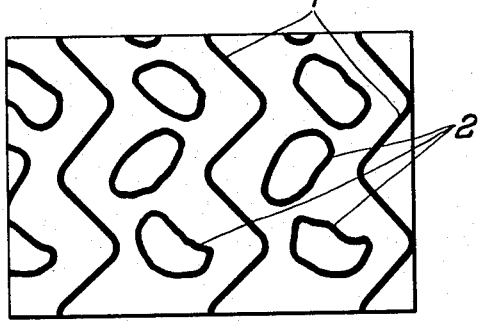
FIG. 1 shows the image of a correctly prestressed sheet of safety glass which is arranged between a polariser and an analyser in crossed relationship to the latter.

If a correctly prestressed sheet of safety glass or another prestressed glass element is observed in polarised light through a crossed analyser, an image is formed in which the surface is transversed by dark bands in corrugated form and/or in closed forms. An example of such an image with corrugated bands 1 and substantially oval patches 2 between the latter is shown in FIGURE 1. As soon as a part of the specimen is not correctly prestressed, the patches 2 assume larger areas or, as with the corrugated bands 1, are entirely missing over a relatively large zone of the image.

Figure 2:
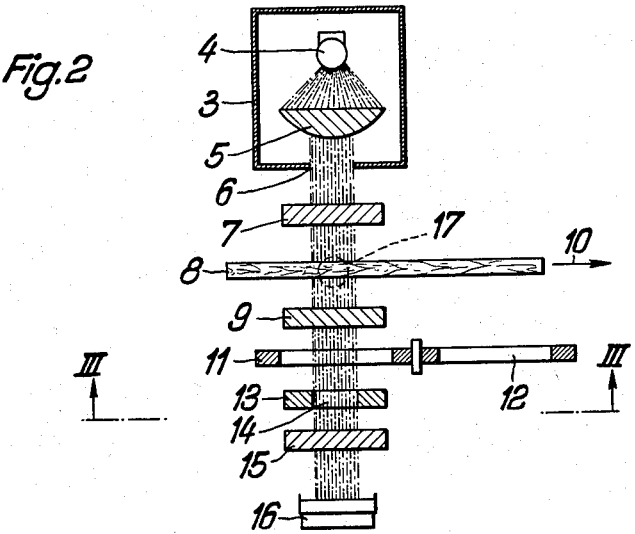
FIG. 2 is a section through an apparatus for carrying out the process.

The testing apparatus shown in FIG. 2 comprises an illuminating box 3 with a fluorescent tube 4 as the light source. It is of course also possible to use any other lamp as the light source. The box also contains a lens 5 for concentrating the light beams in one direction and also an outlet aperture 6. The substantially parallel light beam leaving the box passes through a polariser 7 and is linearly or elliptically polarised therein. The polarised light passing through the polariser travels through the specimen 8, for example, a sheet of safety glass, and thereafter through an analyser 9, which is at an angle to the plane of vibration of the light entering the specimen 8. The specimen 8 is illuminated by the polarised light over its full width (see FIGS. 3 and 4) and is moved during the examination in the direction of the arrow 10, so that its cross-section is scanned in strips. It is of course possible to dispense with the movement of the specimen if the aperture 6 in the illumination box, the two filters and the remainder of the apparatus is made of a size to correspond to the size of the specimen.

The image being formed behind the analyser 9 is scanned strip-wise in a vertical direction, i.e. is split up into individual image elements, by a disk 11 which rotates at a constant speed and which has slots 12 distributed uniformly over its surface and also a fixed frame 13 arranged in front of the said rotating disk. The size of each image element is determined by the width of the slot 14 in the fixed frame 13 and by the width of the slots in the movable disk 11. The slots 12 extend radially; however, they can also be formed in any other manner, for example in the form of spirals, and extend outwardly. Instead of the slots 12, the movable disk can also have transmission windows which are of circular or other form and which are distributed in a corresponding manner over the surface of the disk 11.

The apparatus also comprises a focussing lens 15 which collects the light leaving the disk and frame system 11 and 13 and directs it on to a photoelectric cell 16.

As will be seen more especially from FIGS. 3 and 4, the apparatus also comprises a light barrier which is arranged on both sides of the specimen at its top and bottom edges and consists of a light source 17 and a photoelectric cell 18. The light source projects a narrow light beam or light strip on to the photoelectric cell, which is broken by the passage of a specimen.

The electric circuit of the apparatus is shown by FIG. 5 in the form of a diagrammatic circuit diagram. The photoelectric cell 16, which is affected by the brightness of the light beam scanning the specimen, is connected to an amplifier 19, at the output of which is formed a voltage corresponding to the actual brightness of the incident light. When the brightness is constant in time, this output voltage is a direct voltage, while alternating voltage components of different frequencies are superimposed thereon when there are fluctuations in the brightness of the scanning light beam. Connected to the output side of the amplifier is a filter 20, for example a band filter of known type, which is of such dimensions that it only permits transmission of a prescribed frequency range. Connected on the output side of the filter is a relay 21, which comprises an electromechanical direct current relay 22 with a normal contact 23 and also a series-connected rectifier 24. If an alternating current relay is used as the electromechanical relay, the rectifier 24 is omitted. Instead of an electromechanical relay, it is of course also possible to employ any relay circuit with electronic valves or the like serving the same functions.

The normal contact 23 of the relay 21 is in the feed line to a warning lamp 25 or a warning horn or any other audible warning device 26, which is fed from a direct or alternating current source connected to the terminals 27 and 28.

Connected in series with the normal contact 23 of the relay 21 and also in the feed line to the warning device is a blocking device which comprises a relay 29 with a normal contact 30 and also an amplifier 31 connected in series with the latter. The photoelectric cell 18 of the light barrier described above is connected to the input of the amplifier 31.

The operation of the circuit is as follows:

In the absence of a specimen, the photoelectric cell 18 of the light barrier is illuminated and, through the amplifier 31, causes response of the relay 29 and thus opening of the normal contact 30. By this means, response of the warning device is prevented. As soon as a specimen is introduced into the test apparatus, the photoelectric cell 18 of the light barrier is obscured, the relay 29 falls off and the contact 30 closes, so that the warning device can now be switched on.

The fluctuations in brightness which are received by the photoelectric cell 16, and which correspond to a certain pattern of the optical image and thus to a predetermined stress distribution in the specimen, are amplified and fed to the filter 20. As long as frequencies which are within the transmission range of the filter 20 are included in the frequency mixture at the output of the amplifier, the relay 20 is held in the attracted position and the contact 23 is open. However, as soon as there are no frequencies within the transmission range of the filter at the output of the amplifier, caused by deviations in the stress distribution in the specimen from the normal condition, the relay 22 falls off and closes its normal contact 23, so that the warning device 25, 26 responds.

The circuit described above can of course be modified in many ways without departing from the scope of the invention.

I claim:

1. Apparatus for indicating the extent of stresses in glass and the like which comprises a source of parallel polarized light rays, an analyzer in the path of said light passing transversely through the full area of an intermediate sheet of glass under inspection, an apertured rotary disk for periodically screening said path of light and light indicating means for receiving said screened light.

2. Apparatus as defined in claim 1 in which the disk is interposed in the path of light from the analyzer.

References Cited in the file of this patent

UNITED STATES PATENTS

| | | |
|---|---|---|
| 2,332,308 | Dresser | Oct. 19, 1943 |
| 2,715,244 | Tasker | Aug. 16, 1955 |
| 2,750,519 | Summerhayes et al. | June 12, 1956 |
| 2,803,755 | Milford | Aug. 20, 1957 |
| 2,864,278 | Sparks | Dec. 16, 1958 |

FOREIGN PATENTS

| | | |
|---|---|---|
| 974,768 | France | Oct. 4, 1950 |
| 731,095 | Germany | Feb. 1, 1943 |
| 635,499 | Great Britain | Apr. 12, 1950 |